US009488512B2

(12) United States Patent
Hossain et al.

(10) Patent No.: US 9,488,512 B2
(45) Date of Patent: Nov. 8, 2016

(54) SEMI-EMPIRICAL MASS FLOW MODEL AND CALIBRATION METHOD FOR UNDEVELOPED FLOW REGIONS IN AN AIR SEEDER

(71) Applicant: CNH Industrial Canada, Ltd., Saskatoon (CA)

(72) Inventors: Mohammad Shabbir Hossain, Chittagong (BD); Scott D. Noble, Saskatoon (CA); David Sumner, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 0 days.

(21) Appl. No.: 14/969,961

(22) Filed: Dec. 15, 2015

(65) Prior Publication Data

US 2016/0169725 A1 Jun. 16, 2016

Related U.S. Application Data

(60) Provisional application No. 62/092,525, filed on Dec. 16, 2014.

(51) Int. Cl.
*G01F 1/34* (2006.01)
*A01C 9/00* (2006.01)
*G01F 1/88* (2006.01)

(52) U.S. Cl.
CPC .................................... *G01F 1/88* (2013.01)

(58) Field of Classification Search
CPC .............. G01F 1/34; G01F 1/30; G01F 1/28; G01F 15/00; B65G 53/66; A01C 9/00
USPC .............. 73/861.42, 861.73, 861.74, 861.75, 73/861.77; 406/12; 111/174; 222/1
See application file for complete search history.

(56) References Cited

U.S. PATENT DOCUMENTS 6,546,811 B2 * 4/2003 Fincke .................... G01F 1/44 73/861.63
8,746,158 B2 * 6/2014 Binsirawanich .......... G01F 1/74 111/174
2010/0264163 A1 * 10/2010 Tevs .................... A01C 7/081 222/1
2010/0326339 A1 * 12/2010 Georgison ............ A01C 7/081 111/175
2011/0035163 A1 * 2/2011 Landphair ............ A01C 7/081 702/45

(Continued)

*Primary Examiner* — Jewel V Thompson
(74) *Attorney, Agent, or Firm* — Rebecca L. Henkel

(57) ABSTRACT

A method of determining a mass flow rate of product being applied with an agricultural implement includes the steps of:

calibrating a pressure drop across a known distance in an air line at a number of air flow rates;

metering a product at a desired application rate into the air line at a selected air flow rate;

establishing a pressure drop across the known distance at the selected air flow rate, while the product is being metered;

calculating a specific pressure drop by dividing the established pressure drop by the determined pressure drop;

ascertaining the values of parameters A and B using the mathematical expression:

$$\alpha=1+A\mu+B\sqrt{\mu}$$

where:

α=specific pressure drop;

μ=mass loading ratio; and

A and B=parameters based on measured data for the specific product being applied; and estimating a mass flow rate of the product being applied.

20 Claims, 3 Drawing Sheets

(56) References Cited

U.S. PATENT DOCUMENTS

2012/0036914 A1* 2/2012 Landphair .............. A01C 7/081
73/1.16
2013/0061790 A1* 3/2013 Binsirawanich ....... A01C 7/081
111/174
2014/0283719 A1* 9/2014 Binsirawanich .......... G01F 1/74
111/174

* cited by examiner

SEMI-EMPIRICAL MASS FLOW MODEL AND CALIBRATION METHOD FOR UNDEVELOPED FLOW REGIONS IN AN AIR SEEDER

CROSS REFERENCE TO RELATED APPLICATIONS

This is a non-provisional application based upon U.S. provisional patent application Ser. No. 62/092,525, entitled "SEMI-EMPIRICAL MASS FLOW MODEL AND CALIBRATION METHOD FOR UNDEVELOPED FLOW REGIONS IN AN AIR SEEDER", filed Dec. 16, 2014, which is incorporated herein by reference.

BACKGROUND OF THE INVENTION

1. Field of the Invention

The present invention relates to a system and method for measuring product flow in an agricultural implement, and, more particularly, to such a system and method used with an agricultural seeding implement.

2. Description of the Related Art

Generally, seeding implements are towed behind a tractor or other work vehicle via a hitch assembly secured to a rigid frame of a planter or seeder. These seeding implements typically include one or more ground engaging tools or openers that form a seed trench for seed deposition into the soil. The openers are used to break the soil to enable seed deposition. After the seeds are deposited, each opener is followed by a packer wheel that packs the soil on top of the deposited seeds.

Air seeders are commonly towed by a traction unit, e.g., an agricultural tractor, to apply a material such as seed, fertilizer and/or herbicide to a field. An air seeder has as a primary component a wheeled air cart which includes one or more frame-mounted tanks for holding material. In the case of multiple tanks, the tanks can be separate tanks, or a single tank with internal compartments. The air cart is typically towed in combination with a tilling implement, such as an air drill, one behind the other, to place the seed and fertilizer under the surface of the soil. Air seeders generally include a metering system for dispensing material from the tanks and a pneumatic distribution system for delivering the material from the tanks to the soil. A centrifugal fan provides at least one airstream which flows through the pneumatic distribution system. Material is first introduced to the air stream by the metering system at a primary distribution manifold located below the metering system. The tanks of the air seeders are formed with bottom surfaces that slope downward at an angle of repose for the granular material toward the metering system. Gravity, in combination with the vibrations and movement of the air seeder, act to move the granular material from the perimeter of the tank toward the metering system located at the center of the tank. Material is carried by the air stream through distribution lines to a series of secondary distribution manifolds, which in turn distribute the material through distribution lines to seed boots mounted behind ground openers on the tilling implement so that the product may be evenly delivered to the ground which is tilled by the tilling implement.

To ensure that a desired quantity of product is delivered, a calibration procedure may be performed to calibrate rotation of meter rollers within the metering system to a mass flow rate of product to the openers. Some calibration procedures involve user intervention throughout the process. For example, a user may attach a bag to the metering system to collect expelled product. The user may then instruct the metering system to rotate the meter rollers through a desired number of rotations (e.g., 50 100, 150, 200, etc.). Next, the user may weigh the collected product and enter the weight into a user interface. A controller may then automatically compute a calibration that associates product mass flow rate with rotation of the meter rollers. Such user intervention may be time consuming, and may result in inaccurate calibrations, thereby causing too much or too little product to be delivered.

Current product delivery systems assume that the meter roller has been properly calibrated and remains operating properly throughout usage. Air seeders currently do not provide feedback on the product mass flow rate of the product being conveyed. With a technology shift toward variable-rate and independent control of product flow rates, knowledge of the actual flow within the air seeder will be important to properly controlling the air delivery system. Existing methods for pressure-based mass flow rate determination are either purely empirical, or rely on the flow being fully accelerated and the air velocity being well above a minimum conveying velocity of the product being conveyed. Neither of these conditions are amenable to application on an air cart/drill.

For example, U.S. Pat. No. 8,746,158 (which is assigned to the assignee of the present invention) discloses a pressure based mass flow rate system and method using empirical data. A controller receives pressure sensor signals to determine a pressure drop across a known length of pipe, and compares the pressure drop with data from an empirical pressure database.

What is needed in the art is a faster and more accurate system and method for determining the mass flow rate of a product being conveyed in an air seeder, particularly in regions of undeveloped air flow within the product delivery system.

SUMMARY OF THE INVENTION

The present invention provides a product measurement system for use in an air seeder which provides feedback concerning the actual mass flow rate of the product being applied, and is easier to calibrate on site during use.

The invention in one form is directed to a method of determining a mass flow rate of product being applied with an agricultural implement, including the steps of:

providing an air flow from a pressure source at a known air flow rate in an air line;

determining a pressure drop in the air line along a known distance in a downstream direction using at least one pressure sensor, each pressure sensor being positioned downstream from the pressure source;

repeating the providing and determining steps at a plurality of known air flow rates;

metering a product at a desired application rate into the air line at a selected one of the air flow rates;

establishing a pressure drop across the known distance at the selected air flow rate, while the product is being metered at the desired application rate;

calculating a specific pressure drop by dividing the established pressure drop by the determined pressure drop, at the selected air flow rate;

ascertaining the values of parameters A and B using the mathematical expression:

$$\alpha=1+A\mu+B\sqrt{\mu}$$

where:

α=specific pressure drop;

μ=mass loading ratio; and

A and B=parameters based on measured data for the specific product being applied; and estimating a mass flow rate of the product being applied.

The invention in another form is directed to a mass flow measurement system for determining a mass flow rate of product being applied with an agricultural implement. The mass flow measurement system includes:

a pressure source in communication with an air line;

an air flow sensor in communication with the air line, the air flow sensor being positioned downstream from the pressure source;

a metering device in communication with the air line, the metering device being positioned downstream from the air flow sensor;

at least one pressure sensor in communication with the air line, each pressure sensor being positioned downstream from the metering device;

a controller coupled with each of the pressure source, the air flow sensor, the metering device, and the at least one pressure sensor, the controller being configured for:

actuating the pressure source to provide an air flow at a known air flow rate in the air line using the air flow sensor;

determining a pressure drop in the air line along a known distance in a downstream direction using the at least one pressure sensor;

repeating the actuating and determining steps at a plurality of known air flow rates;

metering a product at a desired application rate into the air line at a selected one of the air flow rates using the metering device;

establishing a pressure drop across the known distance at the selected air flow rate using the at least one sensor, while the product is being metered at the desired application rate;

calculating a specific pressure drop by dividing the established pressure drop by the determined pressure drop, at the selected air flow rate;

ascertaining the values of parameters A and B using the mathematical expression:

$$\alpha=1+A\mu+B\sqrt{\mu}$$

where:

α=specific pressure drop;

μ=mass loading ratio; and

A and B=parameters based on measured data for the specific product being applied; and estimating a mass flow rate of the product being applied.

An advantage of the present invention is that the mass flow rate can be estimated in areas of undeveloped air flow, without requiring long, straight runs.

Another advantage is that the system should be easier to calibrate, having fewer cooefficients to solve for and simpler mathematical relationships. Thus, fewer data points are needed to calibrate.

Yet another advantage is that the one or more sensors can be factory calibrated, and only need a validation/correction in the field.

Yet a further advantage is that it is feasible to develop correlations for the model coefficients based on particle characteristics, further simplifying the calibration process.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, and such exemplification is not to be construed as limiting the scope of the invention in any manner.

DETAILED DESCRIPTION OF THE INVENTION

Figure 1:
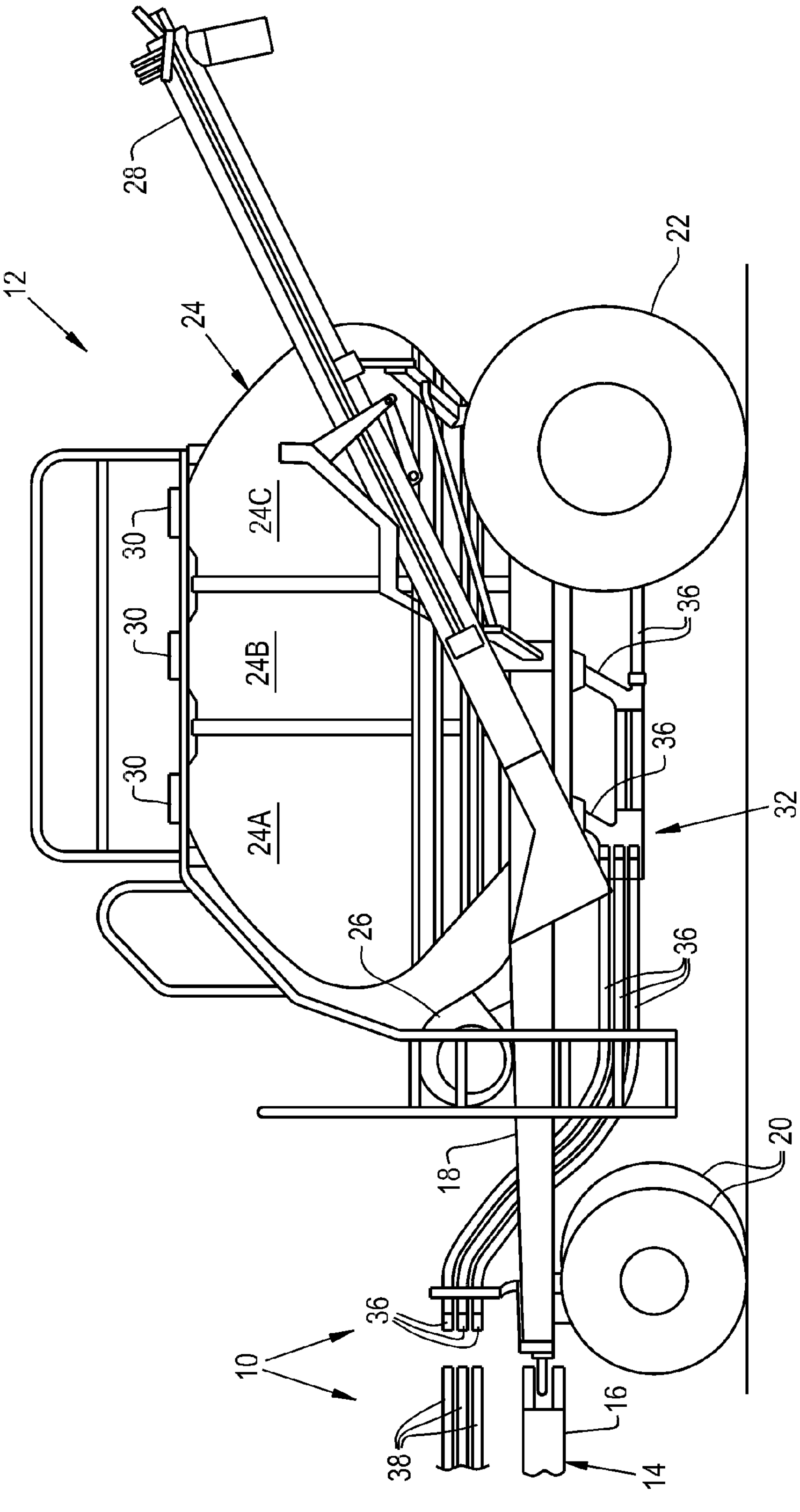
FIG. 1 is a partial, side schematic illustration of an embodiment of an air seeder which can be used with the system and method of the present invention.

Referring now to the drawings, and more particularly to FIG. 1, there is shown a partial, side schematic illustration of an embodiment of an agricultural implement in the form of an air seeder 10 of the present invention. Air seeder 10 generally includes an air cart 12 which is towed by a tilling implement 14 (with only a portion of the rear hitch 16 of tilling implement 14 showing in FIG. 1). In the embodiment shown, tilling implement 14 is in the form of an air drill, but can be differently configured, depending upon the application. For example, tilling implement 14 could be in the form of a planter and air cart 12 could be used to refill mini-hoppers onboard the planter. Air cart 12 may also be configured with a rear hitch (not shown) allowing air cart 12 to be towed in front of, rather than behind, tilling implement 14.

Air cart 12 generally includes a frame 18 which carries steerable front wheels 20, rear wheels 22, tank 24, an air source in the form of a blower 26, and an auger 28. Tank 24 is illustrated as a multi-compartment tank with internal divider walls (not shown) separating the compartments. In the embodiment shown, tank 24 has three compartments 24A, 24B and 24C with each compartment containing a material to be deposited into the soil (such as seed, fertilizer, herbicide and/or insecticide). Each compartment 24A, 24B and 24C has a top hatch 30 allowing loading of the material therein.

Air cart 12 includes a product delivery system in the form of a pneumatic distribution system 32 for delivering the air-entrained material to the trenches in the soil formed by tilling implement 14. Pneumatic distribution system 32 includes a metering system 34 (not specifically shown in FIG. 1, but illustrated in FIG. 2 discussed below), blower 26 and a plurality of air lines 36. Air lines 36 extend forward to and terminate at a convenient location for coupling with air lines 38 associated with tilling implement 14.

In the illustrated embodiment, blower 26 is a centrifugal blower, but can be differently configured. Further, in the illustrated embodiment, three primary air lines 36 are shown, one from each tank compartment 24A, 24B and 24C. However, the number of air lines 36 can vary, depending on the application.

Figure 2:
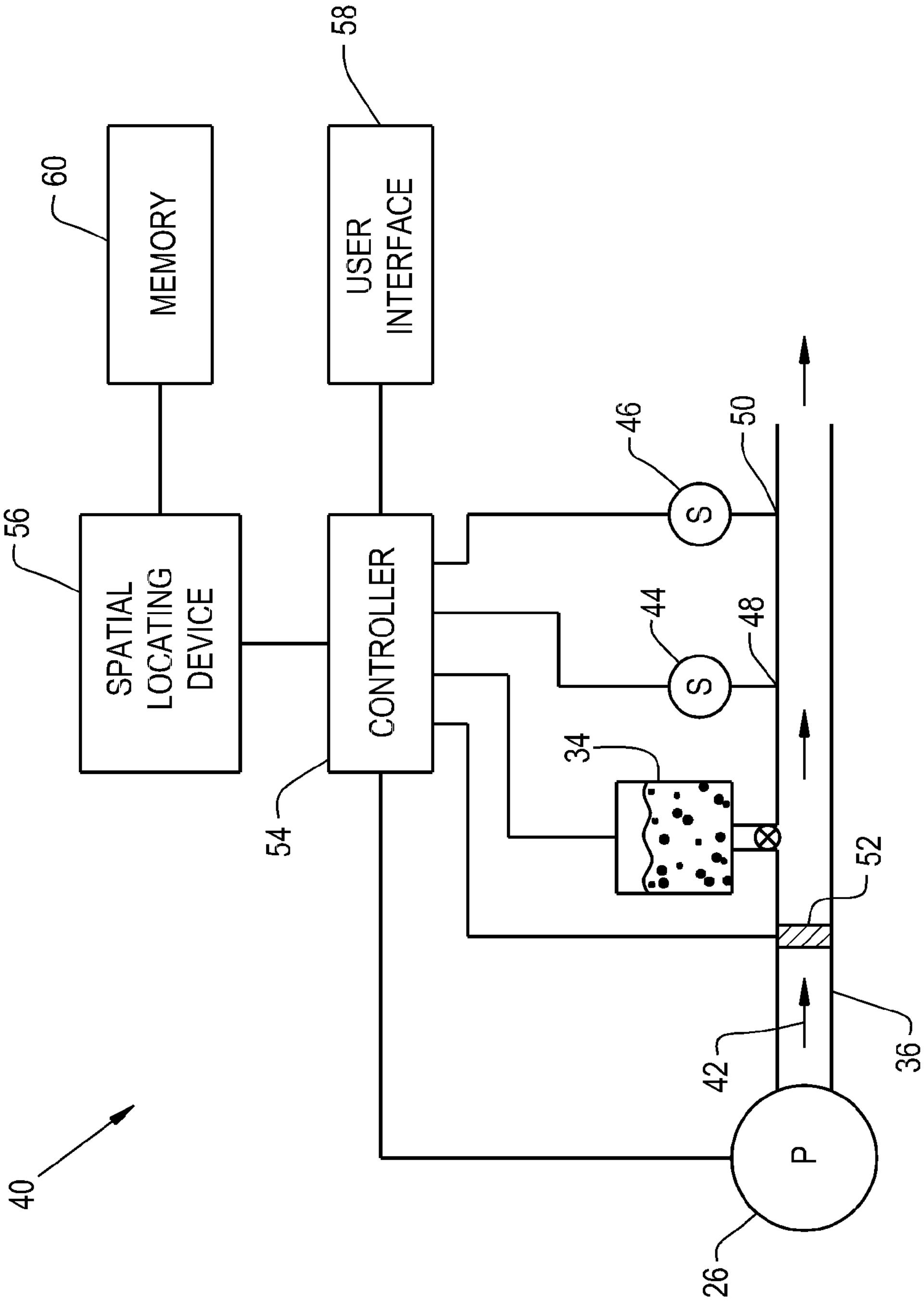
FIG. 2 is a schematic illustration of an embodiment of a product flow measurement system of the present invention.

Referring now to FIG. 2, the air seeder 10 shown in FIG. 1 may include a product flow measurement system 40 for measuring product flow delivered to the trenches formed in the soil. In the illustrated embodiment, the product flow measurement system 40 includes an air source in the form of blower 26 which is configured to provide an air flow 42 into the air lines 36. The metering device 34 is configured to deliver product into the air flow 42, thereby establishing a product/air mixture that flows in a downstream direction toward the implement 14. In the illustrated embodiment, the product flow measurement system 40 is configured to determine a mass flow rate of product through the air lines 36. As illustrated, the product flow measurement system 40 may include a first pressure sensor 44 configured to measure fluid pressure within an upstream portion of the air line 36, and a second pressure sensor 46 spaced from first pressure sensor 44 at a known distance and configured to measure fluid pressure within a downstream portion of the air line 36. The first pressure sensor 44 is fluidly coupled to the air line 36 via a first pressure tap 48, and the second pressure sensor 46 is fluidly coupled to the air line 36 via a second pressure tap 50. The sensors 44 and 46 are configured to measure the fluid pressure within the conduit 38 via the respective pressure taps 48 and 50, and to output respective signals indicative of the measured pressure. As will be appreciated, the first and sensor pressure sensors may include fiber optic sensors, mechanical deflection sensors, piezoelectric sensors, microelectromechanical system (MEMS) sensors, or any other suitable sensor configured to output a signal indicative of fluid pressure within the air line 36.

The product flow measurement system 40 also includes an air flow sensor 52 positioned upstream from the metering device 34. The air flow sensor 52 is configured to measure a flow rate of the air flow 42, and a velocity of the air flow 42. In certain embodiments, the air flow sensor 52 can include an orifice plate having an aperture with a smaller diameter than the air line 36. As the air flow 42 passes through the aperture, the fluid pressure decreases and the velocity increases. By measuring the pressure difference between the air flow upstream and downstream of the aperture, the flow rate (e.g., volumetric flow rate, mass flow rate, etc.) of air flow 42 may be determined. In other embodiments, the air flow sensor 52 can include a hot wire sensor having an electrically heated element extending through the air flow. As will be appreciated, heat transfer from the wire to the air flow is at least partially dependent on the flow rate of the air flow across the wire. Therefore, by measuring the electrical current sufficient to heat the wire to a desired temperature, the flow rate of air flow 42 may be determined. It should also be appreciated that alternative embodiments may include other suitable air flow sensors configured to measure flow rate and/or velocity of the air flow 40. As will be appreciated, if a volumetric flow rate is measured, the mass flow rate may be calculated based on the density of the air.

In the illustrated embodiment, the first pressure sensor 44, the second pressure sensor 46 and the air flow sensor 52 are communicatively coupled to a controller 54. The controller 54 can be variously configured, such as a digital controller, analog controller, or a combination of the two, etc. The controller 54 is configured to receive a first signal from the first pressure sensor 44 indicative of fluid pressure within the upstream portion of the air line 36, and to receive a second signal from the second pressure sensor 46 indicative of fluid pressure within the downstream portion of the air line 36. The controller 54 is also configured to receive a third signal from the air flow sensor 52 indicative of a flow rate of air flow 42, and may receive a fourth signal from the air flow sensor 52 indicative of a velocity of the air flow. Alternatively, the controller 54 may be configured to receive the third signal or the fourth signal, and to determine both the mass flow rate of the air flow and/or the velocity of the air flow based on the single signal. Once the signals have been received, the controller 54 may determine a pressure drop between the upstream and downstream portions of the air line 36 based on the first and second signals. The controller 54 may then determine a mass flow rate of product through the fluid conduit based on the pressure drop, the mass flow rate of the air flow and the velocity of the air flow.

While the illustrated embodiment includes separate pressure sensors 44 and 46, it should be appreciated that alternative embodiments may include a single pressure sensor configured to directly measure the pressure drop between the upstream and downstream portions of the air line 36. For example, in certain embodiments, a differential pressure sensor may be fluidly coupled to the first pressure tap 48, and to the second pressure tap 50. In such embodiments, the differential pressure sensor may be configured to output a signal indicative of the pressure difference (i.e., pressure drop) between the upstream portion of the air line 36 and the downstream portion of the air line 36. Accordingly, the controller 54 may determine the product mass flow rate based on the differential pressure signal.

For precision farming applications, a spatial locating device 56 (e.g., GPS unit) can be used to provide spatial data to the controller 54 indicative of a geo-spatial location of the air seeder within a field. The spatial data can be matched with data from soil charts, application rates, etc. for the field to carry out variable application seeding with the air seeder 10.

A user interface 58 allows an operator to enter various input data into the controller 54 for operation of the air seeder 10. For example, the user could enter a particular type of material to be applied, whether the operator wishes to use constant or variable rate application, etc. The user interface can be any suitable type of interface, such as a touch screen, keyboard, etc.

As indicated above, known models for determining a mass flow rate of the product being dispensed assume that the metering device works properly after being calibrated, and also assume that the product is fully suspended in the air stream, each of which may be faulty assumptions. There is no way to know if the product mass flow rate changes outside of acceptable limits. Further, known models may also calculate for the pressure drop factor for solids ($\lambda_Z$) in a simplified form by neglecting the effect of gravity. That assumption can be made when the particles have travelled far enough to be considered fully suspended. But when the pressure drop measurement comes within the first meter or so, neglecting gravitational effect may not be a valid assumption, especially, for lower superficial air velocities.

According to an aspect of the present invention, feedback is provided to the controller 54 to determine if the dispense rate of the metering device falls outside of acceptable limits, and the effects of gravity in non-developed areas of flow are included in the model. To that end, a complete representation of the pressure drop factor for solids ($\lambda_Z$), including the effects of gravity in areas of flow which are not fully developed, is shown in Equation [1], $$\lambda_Z = \lambda_Z^* \frac{c}{v} + \frac{2\beta}{\frac{c}{v} Fr^2}, \qquad [1]$$

where $\lambda_Z^*$ is the impact and friction factor for solids [dimensionless], c is the particle velocity [m/s], v is the superficial air velocity [m/s], β is the velocity ratio related to particle fall velocity in a cloud [dimensionless], and Fr is the Froude number [dimensionless].

The Froude number (Fr) in Equation [1] is the ratio of inertial force and gravitational force, whereas β is the ratio of particle fall velocity due to gravity and superficial air velocity. With the representation of pressure drop according to Equation [1], the expression for specific pressure drop takes the form:

$$\alpha = 1 + \left( \frac{\lambda_Z^* \frac{c}{v} + \frac{2\beta}{\frac{c}{v} Fr^2}}{\lambda_L} \right) \mu. \qquad [2]$$

In separate experiments, the relationship between mass loading ratio (μ) and Froude number (Fr) at the pressure minimum condition have been determined. Experiments have been conducted with Polystyrol (diameter 1 mm-2.5 mm) inside carbon steel pipe. The developed relationship was valid for pipe diameters of 50 mm-400 mm. It is given by $$\mu = K Fr^A, \qquad [3]$$

where K is an experimental constant [dimensionless].

Assuming Equation [3] is valid for this disclosure as well, putting $$Fr^2 = \sqrt{\frac{\mu}{K}}$$

in equation [2] gives the expression for specific pressure drop as $$\alpha = 1 + \left(\frac{\lambda_Z^*}{\lambda_L}\right)\left(\frac{c}{v}\right)\mu + \frac{2\beta\sqrt{K}}{\left(\frac{c}{v}\right)\lambda_L}\sqrt{\mu}. \qquad [4]$$

$$\text{Letting } A = \left(\frac{\lambda_Z^*}{\lambda_L}\right)\left(\frac{c}{v}\right), \qquad [5]$$

$$\text{and } B = \frac{2\beta\sqrt{K}}{\left(\frac{c}{v}\right)\lambda_L}, \qquad [6]$$

equation [4] then takes the form:

$$\alpha = 1 + A\mu + B\sqrt{\mu}. \qquad [7]$$

Equation [7] has both linear and non-linear components. If the value of B is substantially smaller compared to the value of A, the specific pressure drop vs. mass loading ratio should be linear. If gravitational effects become significant at lower velocities, the plot will become non-linear because the value of B in that case will not be negligible. The experimental plots obtained when pressure drop was measured in between 0.3 m and 0.9 m of the test section, were also linear for higher velocities and nonlinear for lower velocities. To see whether Equation [7] can represent both the linear and nonlinear trends observed in the experiments, it was optimized to determine the values of unknown parameters A and B at each air velocity being considered.

Optimization of the parameters A and B was carried out by using the MATLAB engineering analysis software and an appropriate algorithm. The selected algorithm is best suited for non-linear optimization. Table 1 lists the value of parameters A and B for different air velocities, and a selected product type (the values of A and B vary, depending on product/particle type (e.g., wheat, corn, granular herbicide, granular fertilizer, etc)).

TABLE 1

Values of parameters A and B at different air velocities

| Air Velocity (m/s) | Value of A | Value of B |
|---|---|---|
| 30 | 1.7818 | −0.1287 |
| 28 | 1.6573 | 0.1784 |
| 26 | 1.6494 | 0.2547 |
| 24 | 1.387 | 0.4825 |
| 22 | 1.0593 | 0.7139 |
| 20 | 0.5058 | 1.1983 |
| 18 | 0.2056 | 1.5464 |
| 16 | −0.2585 | 2.0845 |
| 14 | −0.4723 | 2.2856 |
| 13 | −0.1951 | 1.965 |

It can be seen from the table that the value of A dominates at higher velocities. As the air velocity decreases, the value of B starts to dominate. All of these optimizations had an R-Square value greater than 0.99. Equations [5] and [6] suggest that parameters A and B are ratios of positive dimensionless numbers and velocity magnitudes. Hence they cannot have negative values. For this reason optimized values of A and B were adjusted with the curve fitting tool of the MATLAB software. The adjusted values of A and B (with 95% confidence interval) are presented in Table 2 along with the R-Square values.

TABLE 2

Adjusted values of Parameter A and B at different air velocities

| Air Velocity (m/s) | Value of A | Value of B | R-Square |
|---|---|---|---|
| 30 | 1.65 | 0.05 | 0.9923 |
| 29 | 1.65 | 0.15 | 0.9977 |
| 28 | 1.65 | 0.20 | 0.9977 |
| 27 | 1.65 | 0.25 | 0.9850 |
| 26 | 1.65 | 0.30 | 0.9953 |
| 25 | 1.48 | 0.40 | 0.9966 |
| 24 | 1.39 | 0.48 | 0.9962 |
| 23 | 1.25 | 0.53 | 0.9951 |
| 22 | 1.06 | 0.71 | 0.9969 |
| 21 | 0.95 | 0.79 | 0.9919 |
| 20 | 0.75 | 0.93 | 0.9842 |
| 19 | 0.65 | 1.03 | 0.9857 |
| 18 | 0.48 | 1.23 | 0.9840 |
| 17 | 0.23 | 1.37 | 0.9804 |
| 16 | 0.15 | 1.61 | 0.9747 |
| 15 | 0.001 | 1.72 | 0.9703 |

The value of parameter A remains constant at higher velocities and gradually decreases with air velocity. This indicates that even when pressure drop is measured closer to the metering device 34, the majority of the particles are fully accelerated at higher velocities. For this reason the value of A remains substantially constant. But due to the presence of parameter B (i.e., due to some particles not attaining full acceleration), the overall value of the slope was different at higher velocities. Below 15 m/s the value of A becomes negative. Therefore, based on the MATLAB analysis, the model presented in Equation [7] is valid for air velocities from 15 m/s-30 m/s.

Figure 3:
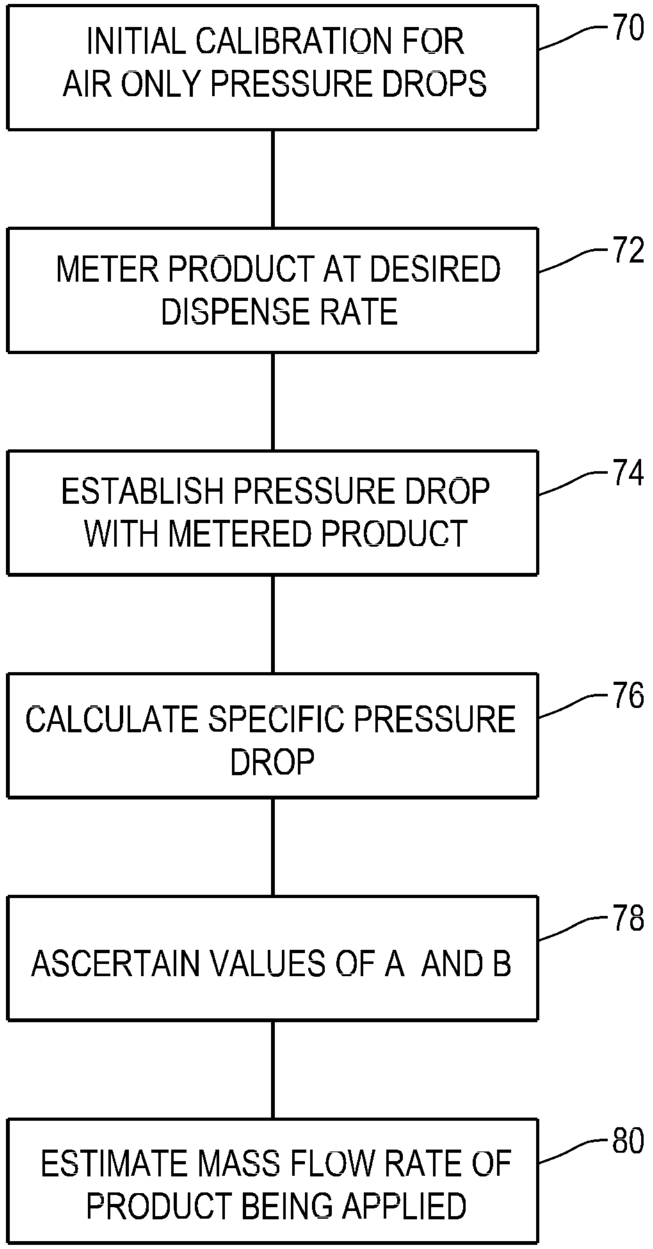
FIG. 3 is a flow chart illustrating an embodiment of a method of determining a mass flow rate of product being applied in an agricultural air seeder.

The product mass flow analysis model described above accounts for particle interaction and acceleration effects that apply at low conveying velocities and the undeveloped region. These factors introduce non-linarites into the specific pressure drop ($\alpha$=pressure drop for air and product/pressure drop for air only), vs mass loading ratio $\mu$ relationship. In one embodiment, and referring to FIG. 3, the mass flow rate of the product in the air seeder 10 for use with the model described above can be accomplished using the following method:

Step 1: System records pressure drop over the entire range of velocity for air only once operator starts machine (block 70).

Step 2: Operator dispenses product at desired roller speed and air velocity and system records pressure drop (block 72 and 74).

Step 3: Calculate specific pressure at the operating velocity (by dividing pressure drop due to the mixture by pressure drop due to air only (block 76).

Step 4: Determine the value of parameters A and B (block 78).

Step 5: Estimate mass flow rate of the product being applied (block 80). In a similar manner, the mass flow rate of any product can be estimated. The basic form of the model will remain the same as Equation [7], which is given by $\alpha=1+A\mu+B(\mu)^{\wedge}½$. This relationship must be developed between parameters A and B, and the average air velocity separately for each product.

In the example above, Steps 2, 3 and 4 establish the parameters A and B based on measured data for the specific product being applied. However, it may also be possible to use empirical data for the product being applied to determine the values of the parameters A and B. For example, the controller 54 may be configured to establish a relationship between the measured parameters (i.e., flow rate of the air flow, velocity of the air flow, and pressure drop through the air line) and the mass flow rate of product through the air line based on empirically derived parameters. For example, at least one empirical parameter may be associated with each product (e.g., seed, fertilizer, etc.), and the controller 54 may be configured to determine the mass flow rate of product through the air line 36 based on the pressure drop, the mass flow rate of the air flow, the velocity of the air flow, and the empirical parameters. The empirical parameters may be stored in a non-volatile memory 60, which includes a list of products and a corresponding list of empirical parameters. By way of example, prior to operation of the air seeder 10, an operator may select the type of product (e.g., seed, fertilizer, etc.) stored within the tank 24 of the air cart 12 via a user interface 58. The controller 54, in turn, may select the appropriate empirical parameters from the memory 60 based on the selected product. During operation of the air seeder 10, the controller 54 may determine the mass flow rate of product to the implement 14 based on the pressure drop, the flow rate of the air flow, the velocity of the air flow, and the empirical parameters associated with the product flowing to the ground engaging tools of the implement 14.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of determining a mass flow rate of product being applied with an agricultural implement, comprising the steps of:

providing an air flow from a pressure source at a known air flow rate in an air line;

determining a pressure drop in the air line along a known distance in a downstream direction using at least one pressure sensor, each said pressure sensor being positioned downstream from the pressure source;

repeating the providing and determining steps at a plurality of known air flow rates;

metering a product at a desired application rate into the air line at a selected one of the air flow rates;

establishing a pressure drop across the known distance at the selected air flow rate, while the product is being metered at the desired application rate;

calculating a specific pressure drop by dividing the established pressure drop by the determined pressure drop, at the selected air flow rate;

ascertaining the values of parameters A and B using the mathematical expression:

$$\alpha=1+A\mu+B\sqrt{\mu}$$

where:

$\alpha$=specific pressure drop;

$\mu$=mass loading ratio; and

A and B=parameters based on measured data for the specific product being applied; and estimating a mass flow rate of the product being applied.

2. The method of claim 1, wherein the parameter A is represented by the mathematical expression:

$$A=\left(\frac{\lambda_Z^*}{\lambda_L}\right)\left(\frac{c}{v}\right)$$

and the parameter B is represented by the mathematical expression:

$$B=\frac{2\beta\sqrt{K}}{\left(\frac{c}{v}\right)\lambda_L},$$

where:

$\lambda_Z$=impact and friction factor for solids;

$\lambda_L$=air resistance coefficient;

c=particle velocity of the product in the air flow;

v=average/superficial air velocity;

$\beta$=velocity ratio related to particle fall velocity in a cloud; and

K=dimensionless experimental constant.

3. The method of claim 1, wherein the mass loading ratio $\mu$ is defined by the mathematical expression:

$$\mu=KFr^A,$$

where:

Fr=Froude number (Fr) at a pressure minimum condition; and

K=dimensionless experimental constant.

4. The method of claim 1, wherein the parameters A and B are determined based upon emperical data corresponding to a specific product being applied.

5. The method of claim 4, wherein the parameters A and B are determined based upon emperical data which is stored in a memory.

6. The method of claim 4, wherein the selected product includes seed, fertilizer, herbicide or insecticide.

7. The method of claim 1, wherein the at least one sensor includes a first pressure sensor and a second pressure sensor which are spaced apart at the known distance, and the determining step includes determining a pressure drop in the air line between the first pressure sensor and the second pressure sensor, the first pressure sensor being downstream from the pressure source and the second pressure sensor being downstream from the first pressure sensor.

8. The method of claim 1, wherein the providing step is carried out using an air flow sensor in the air line to determine the known air flow rate.

9. The method of claim 1, wherein the air flow sensor is positioned between the pressure source and the at least one pressure sensor.

10. The method of claim 1, wherein the known air flow rate includes at least one of a volumetric flow rate and a velocity of the air flow.

11. The method of claim 1, wherein the agricultural implement is an air seeder.

12. A mass flow measurement system for determining a mass flow rate of product being applied with an agricultural implement, said mass flow measurement system comprising:

a pressure source in communication with an air line;

an air flow sensor in communication with the air line, said air flow sensor being positioned downstream from the pressure source;

a metering device in communication with the air line, said metering device being positioned downstream from the air flow sensor;

at least one pressure sensor in communication with the air line, each said pressure sensor being positioned downstream from the metering device;

a controller coupled with each of the pressure source, the air flow sensor, the metering device, and the at least one pressure sensor, the controller being configured for:

actuating the pressure source to provide an air flow at a known air flow rate in the air line using the air flow sensor;

determining a pressure drop in the air line along a known distance in a downstream direction using the at least one pressure sensor;

repeating the actuating and determining steps at a plurality of known air flow rates;

metering a product at a desired application rate into the air line at a selected one of the air flow rates using the metering device;

establishing a pressure drop across the known distance at the selected air flow rate using the at least one sensor, while the product is being metered at the desired application rate;

calculating a specific pressure drop by dividing the established pressure drop by the determined pressure drop, at the selected air flow rate;

ascertaining the values of parameters A and B using the mathematical expression:

$$\alpha = 1 + A\mu + B\sqrt{\mu}$$

where:

α=specific pressure drop;

μ=mass loading ratio; and

A and B=parameters based on measured data for the specific product being applied; and estimating a mass flow rate of the product being applied.

13. The mass flow measurement system of claim 12, wherein the parameter A is represented by the mathematical expression:

$$A = \left(\frac{\lambda_Z^*}{\lambda_L}\right)\left(\frac{c}{v}\right)$$

and the parameter B is represented by the mathematical expression:

$$B = \frac{2\beta\sqrt{K}}{\left(\frac{c}{v}\right)\lambda_L},$$

where:

$\lambda_Z$=impact and friction factor for solids;

$\lambda_L$=air resistance coefficient;

c=particle velocity of the product in the air flow;

v=average/superficial air velocity;

β=velocity ratio related to particle fall velocity in a cloud; and

K=dimensionless experimental constant.

14. The mass flow measurement system of claim 12, wherein the mass loading ratio μ is defined by the mathematical expression:

$$\mu = KFr^A,$$

where:

Fr=Froude number (Fr) at a pressure minimum condition; and

K=dimensionless experimental constant.

15. The mass flow measurement system of claim 12, wherein the parameters A and B are determined based upon emperical data corresponding to a specific product being applied.

16. The mass flow measurement system of claim 15, wherein the parameters A and B are determined based upon emperical data which is stored in a memory.

17. The mass flow measurement system of claim 15, wherein the selected product includes seed, fertilizer, herbicide or insecticide.

18. The mass flow measurement system of claim 12, wherein the at least one sensor includes a first pressure sensor and a second pressure sensor which are spaced apart at the known distance, and the determining step includes determining a pressure drop in the air line between the first pressure sensor and the second pressure sensor, the first pressure sensor being downstream from the pressure source and the second pressure sensor being downstream from the first pressure sensor.

19. The mass flow measurement system of claim 12, wherein the known air flow rate includes at least one of a volumetric flow rate and a velocity of the air flow.

20. The mass flow measurement system of claim 12, wherein the agricultural implement is an air seeder.

* * * * *